(12) United States Patent
Wada et al.

(10) Patent No.: US 10,800,303 B2
(45) Date of Patent: Oct. 13, 2020

(54) OPERATION KNOB DEVICE FOR ARMREST

(71) Applicants: HONDA MOTOR CO., LTD., Tokyo (JP); Lear Corporation Japan Ltd., Yokohama-shi, Kanagawa (JP)

(72) Inventors: Koichiro Wada, Wako (JP); Zhengda Mao, Shanghai (CN); Anand Patil, Yokohama (JP); Masao Sebata, Yokohama (JP); Chunhua Hu, Shanghai (CN); XiaoZhong Wu, Shanghai (CN); YuLiang Wang, Shanghai (CN); Cheng Peng, Shanghai (CN)

(73) Assignees: HONDA MOTOR CO., LTD., Tokyo (JP); LEAR CORPORATION JAPAN LTD., Yokohama-shi, Kanagawa (JP)

( * ) Notice: Subject to any disclaimer, the term of this patent is extended or adjusted under 35 U.S.C. 154(b) by 55 days.

(21) Appl. No.: 16/311,275

(22) PCT Filed: Feb. 2, 2018

(86) PCT No.: PCT/JP2018/003672
§ 371 (c)(1),
(2) Date: Dec. 19, 2018

(87) PCT Pub. No.: WO2018/189985
PCT Pub. Date: Oct. 18, 2018

(65) Prior Publication Data
US 2019/0184874 A1    Jun. 20, 2019

(30) Foreign Application Priority Data

Apr. 14, 2017  (CN) .......................... 2017 1 0243932

(51) Int. Cl.
*B60N 2/75*  (2018.01)
*B60N 2/90*  (2018.01)
(Continued)

(52) U.S. Cl.
CPC ............... *B60N 2/757* (2018.02); *B60N 2/75* (2018.02); *B60N 2/90* (2018.02); *B60N 2/938* (2018.02);
(Continued)

(58) Field of Classification Search
CPC ....... B60N 2/757; E05B 83/32; Y10T 292/57; Y10T 292/82; E05C 1/10
See application file for complete search history.

(56) References Cited

U.S. PATENT DOCUMENTS 5,895,729 A * 4/1999 Phelps, III .......... H04M 1/0262
429/123
6,660,427 B1 * 12/2003 Hukill ................. H01M 2/1066
361/600

(Continued)

FOREIGN PATENT DOCUMENTS

JP    5-37156 U    5/1993
JP    9-249059 A   9/1997
(Continued)

OTHER PUBLICATIONS

_ International Search Report dated May 1, 2018, issued in counterpart International Application No. PCT/JP2018/003672, w/English translation (4 pages).

*Primary Examiner* — Syed A Islam
(74) *Attorney, Agent, or Firm* — Westermann, Hattori, Daniels & Adrian, LLP

(57) ABSTRACT

A operation knob device (10) for an armrest, that is configured to unlock the armrest and moves the armrest to a useable state, includes: a knob min body (30) having an operation knob (32); and an inner case (50) disposed around the knob main body (30) and configured to expose the operation knob (32) from a first opening (55). The inner case (50) includes a plurality of case protrusions (60) that protrude from a lower region (54a) of a lower edge of the first
(Continued)

opening (55) toward the knob main body (30). The knob main body (30) includes a plurality of main body protrusions (40) that protrude toward the lower region (54*a*) of the inner case (50). The plurality of case protrusions (60) and the plurality of main body protrusions (40) are alternately disposed when viewed in a +Z direction.

10 Claims, 5 Drawing Sheets

(51) Int. Cl.
  *E05B 83/32* (2014.01)
  *E05C 1/10* (2006.01)
(52) U.S. Cl.
  CPC ............... *E05B 83/32* (2013.01); *E05C 1/10* (2013.01); *Y10T 292/57* (2015.04); *Y10T 292/82* (2015.04)

(56) References Cited

U.S. PATENT DOCUMENTS

| | | | | |
|---|---|---|---|---|
| 7,735,913 | B2* | 6/2010 | Crombez | ............... B60N 3/101 |
| | | | | 297/113 |
| 8,320,122 | B2* | 11/2012 | Liu | ..................... H01M 2/1066 |
| | | | | 361/679.56 |
| 10,556,688 | B2* | 2/2020 | Bhat | .................. B64D 11/0638 |
| 2012/0267933 | A1* | 10/2012 | von Rothkirch und Panthen ....... |
| | | | | B60N 3/101 |
| | | | | 297/411.32 |

FOREIGN PATENT DOCUMENTS

| | | |
|---|---|---|
| JP | 11-189257 A | 7/1999 |
| JP | 2005-287724 A | 10/2005 |
| JP | 2010-89602 A | 4/2010 |
| JP | 2014-73702 A | 4/2014 |
| JP | 2018-16236 A | 2/2018 |

* cited by examiner

OPERATION KNOB DEVICE FOR ARMREST

TECHNICAL FIELD

The present invention relates to an operation knob device for an armrest.

Priority is claimed on Chinese Patent Application No. 201710243932.2, filed Apr. 14, 2017, the content of which is incorporated herein by reference.

BACKGROUND ART

A rear seat unit is disposed in the rear of an interior of a vehicle. The rear seat unit includes left and right seats and an armrest disposed between the left and right seats. The armrest is pivotably formed between a used position in which it is used as such and an unused position in which it is aligned with the seat backs of the left and right seats. The rear seat unit includes a locking mechanism that holds the armrest in the unused position. The armrest includes an unlocking device that unlocks the locking mechanism (e.g., see Patent Document 1).

As an example of the unlocking device, an operation knob device has been developed. The operation knob device includes a knob main body on which an operation knob is formed, and a case that is disposed around the knob main body and is fixed to an armrest. The case includes an opening from which the operation knob is exposed. The case supports the knob main body in a state in which the knob main body can be moved by an operation. A passenger of a vehicle operates the operation knob from the opening of the case, and unlocks a locking mechanism. The passenger pivots the unlocked armrest from an unused position to a used position.

CITATION LIST

Patent Document

[Patent Document 1]
Japanese Unexamined Patent Application, First Publication No. 2005-287724

SUMMARY OF INVENTION

Technical Problem

As described above, the case includes the opening. Since the knob main body is a movable member, there is a gap between the knob main body and the case. For this reason, there is a possibility of a small object such as a coin falling from the opening of the case to the inside of the operation knob device through this gap. A small object that falls into the inside of the operation knob device cannot be easily removed. For this reason, providing an operation knob device into which falling of a small object is able to be prevented is required.

Therefore, an object of the present invention is to provide an operation knob device for an armrest into which falling; of a small object is able to be prevented.

Solution to Problem

In order to resolve the above problem, an operation knob device for an armrest of the present invention adopts the following constitutions.

(1) An operation blob device for an armrest (e.g., au operation knob device 10 in an embodiment), that is configured to unlock the armrest (e.g., the armrest 8 in the embodiment) and moves the armrest in a useable state, includes: a knob main body (e.g., a knob main body 30 in the embodiment) having an operation knob (e.g., an operation knob 32 in the embodiment); and a first case (e.g., an inner case 50 in the embodiment) disposed around the knob main body and configured to expose the operation knob from a first opening (e.g., a first opening 55 in the embodiment). The first ease includes a plurality of case protrusions (e.g., case protrusions 60 in the embodiment) that protrude from a lower region (e.g., a lower region 54a in the embodiment) at a lower edge of the first opening toward the knob main body. The knob main body includes a plurality of main body protrusions (e.g., main body protrusions 40 in the embodiment) that protrude toward the lower region of the first case. The plurality of case protrusions and the plurality of main body protrusions are alternately disposed when viewed from above.

A small object sometimes enters from the first opening of the inner case into the operation knob device. Even in this case, the plurality of main body protrusions and the plurality of case protrusions that are alternately disposed catch the small object. Thereby, the small object can be prevented from falling from a gap between the knob main body and the inner case into the inside of the operation knob device.

(2) Each of the case protrusions is configured such that a protruding height of an upper half part thereof (e.g., an upper half part 60A in the embodiment) is lower than that of a lower half part thereof (e.g., a lower half part 60B in the embodiment).

Since the protruding height of the upper half part is low, the case protrusions are hardly visible through the first opening of the inner case. Therefore, the design of the operation knob device is improved.

(3) A width (e.g., a width 40w in the embodiment) of each of the main body protrusions when viewed from above is wider than a width (e.g., a width 60w in the embodiment) of each of the case protrusions when viewed from above.

In this case, a gap between neighboring main body protrusions is reduced. For this reason, a small object can be prevented from falling into a gap between the case protrusions of the inner case and the knob main body.

(4) Each of the main body protrusions is configured such that a protruding height of an upper end thereof (e.g., an upper end-cum-front end 40a in the embodiment) is higher than that of a lower end thereof (e.g., a lower end-cum-front end 40b in the embodiment).

Since the protruding height of the upper end is high, the main body protrusions reliably catch a small object. Since the protruding height of the lower end is low, the knob main body 30 can be reduced in weight.

(5) A front end (e.g., an upper end-cum-front end 60b of the lower half part 60B in the embodiment) of each of the case protrusions is disposed closer to the lamb main body than a front end (e.g., an upper end-cum-front end 40a in the embodiment) of each of the main body protrusions.

In this ease, no gap occurs between the case protrusion and the main body protrusion in a forward/backward direction. Therefore, fang in of a small object can be reliably prevented.

(6) The operation knob device for an armrest further includes a second case (e.g., an outer case 20 in the embodiment) configured to cover a periphery of the first opening of the first case and expose the operation knob from a second opening (e.g., a second opening 24 in the embodiment), and the upper end (e.g., the upper end-cum-front end 40a in the embodiment) of each of the main body protrusions is disposed below a lower edge (e.g., a lower edge 25 in the embodiment) of the second opening.

Since the upper end of each of the main body protrusions is disposed below, the main body protrusions are hardly visible through the second opening of the outer case. Therefore, the design of the operation knob device is improved.

Advantageous Effects of Invention

According to the present invention, a plurality of main body protrusions and a plurality of case protrusions that are alternately disposed catch a small object. Thereby, the small object can be prevented from falling from a gap between a knob main body and an inner case into the inside of an operation knob device.

DESCRIPTION OF EMBODIMENTS

Hereinafter, an embodiment of an operation knob device for an armrest in the present invention will be described with reference to the attached drawings.

X, Y and Z directions to be used in the following description are defined as follows. The X direction is a forward/backward direction in a vehicle, an +X direction being a forward direction in the vehicle, and an −X direction being a backward direction in the vehicle. The Y direction is a leftward/rightward direction in the vehicle. The Z direction is an upward/downward direction in the vehicle, a +Z direction being an upward direction in the vehicle, and a −Z direction being a downward direction in the vehicle. The X, Y, and Z directions may not be strictly identical to the directions defined above. For example, the X direction may be a direction that is slightly inclined from the forward/backward direction in the vehicle in the upward/downward direction. The Z direction may be a direction that is slightly inclined from the upward/downward direction in the vehicle in the forward/backward direction.

Figure 1:
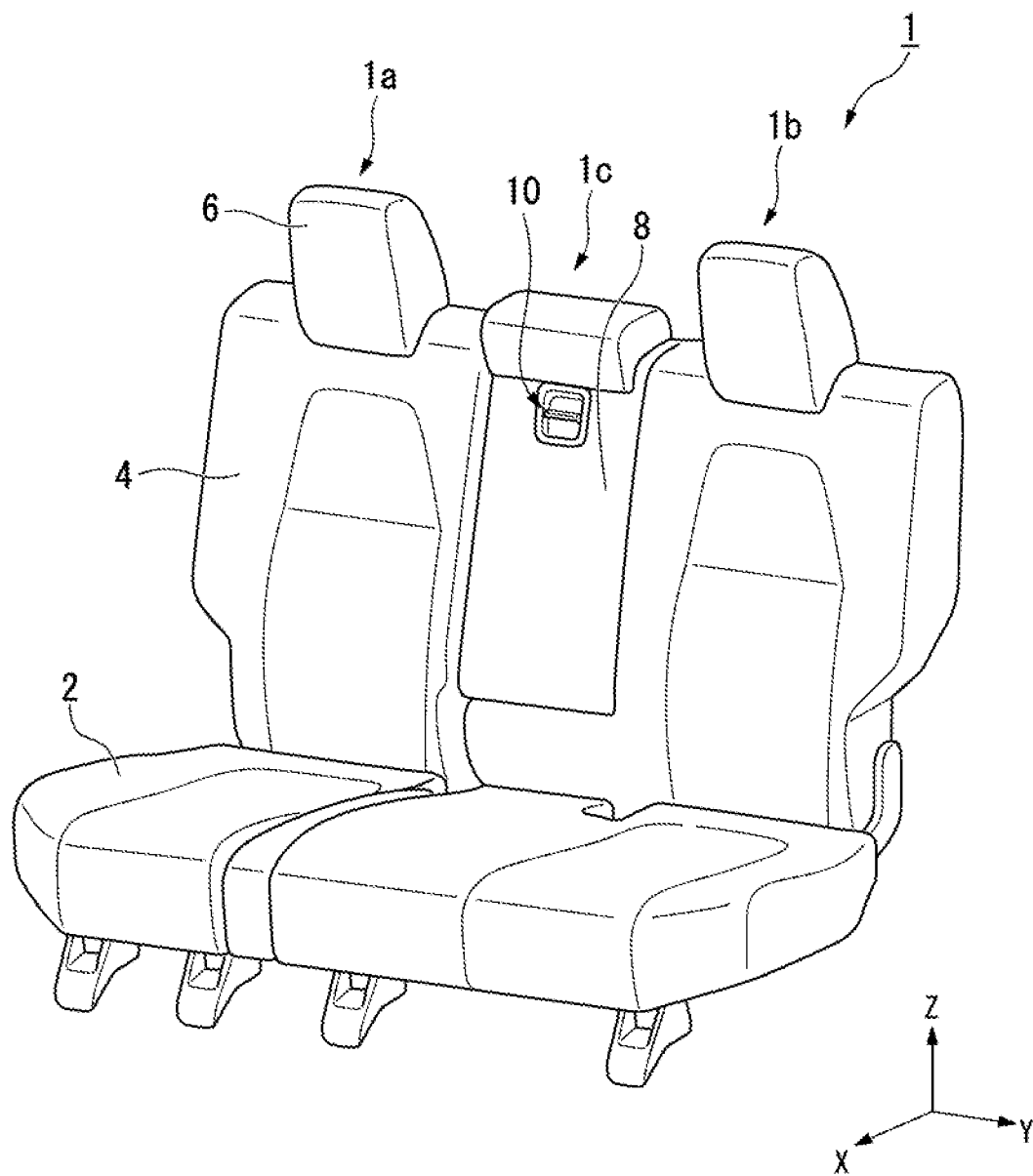
FIG. 1 is a perspective view of a rear seat unit of a vehicle.

FIG. 1 is a perspective view of a rear seat unit of a vehicle. A rear seat unit 1 is disposed in the rear of an interior of the vehicle. The rear seat unit includes a right seat 1a, a left seat 1b, and an armrest 8. Each of the left and right seats 1a and 1b includes a seat cushion 2, a seat back 4, and a head rest 6. The armrest 8 is disposed between the seat backs 4 of the left and right seats 1a and 1b. The armrest 8 is pivotably formed between a used position in which it is used as such and an unused position in which it is aligned with the seat backs 4 of the left and right seats 1a and 1b. The armrest 8 functions as a seat back 4 of a middle seat 1c when disposed in the unused position. The rear seat unit 1 includes a locking mechanism (not shown) that holds the armrest 8 in the unused position. The armrest 8 includes an operation knob device 10 as an unlocking device that unlocks the locking mechanism.

The operation knob device 10 is exposed to a surface of the armrest 8 which is directed in the +X direction, in a state in which the armrest 8 is disposed in the unused position. The operation knob device 10 includes all operation knob 32 in the middle thereof (see FIG. 3). When a passenger of the vehicle performs an operation of pulling down the operation knob 32 in the −Z direction, the locking mechanism is unlocked. Thereby, the armrest 8 can be pivoted from the unused position to the used position.

Figure 2:
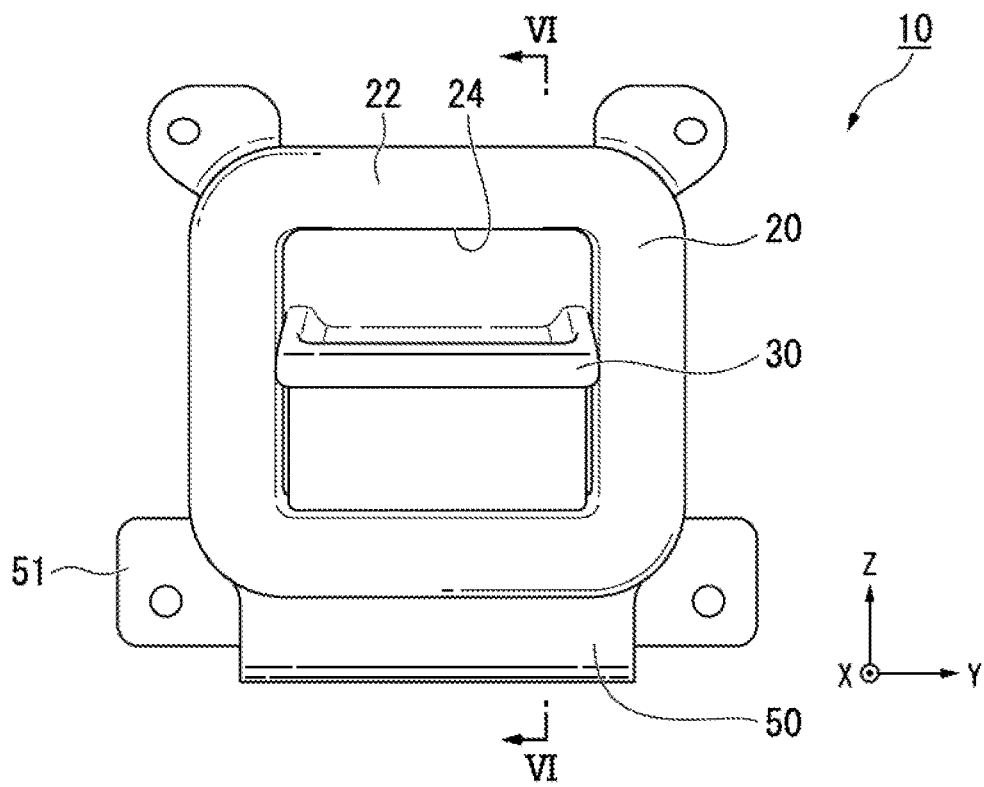
FIG. 2 is a front view of an operation knob device for an armrest in an embodiment.

FIG. 2 is a front view of an operation knob device for an armrest in an embodiment. The operation knob device 10 includes a knob main body 30, an inner case (a first case) 50, and an outer case (a second ease) 20. The operation knob device 10 is mounted on the armrest via mounts 51 of the inner case 50.

Figure 3:
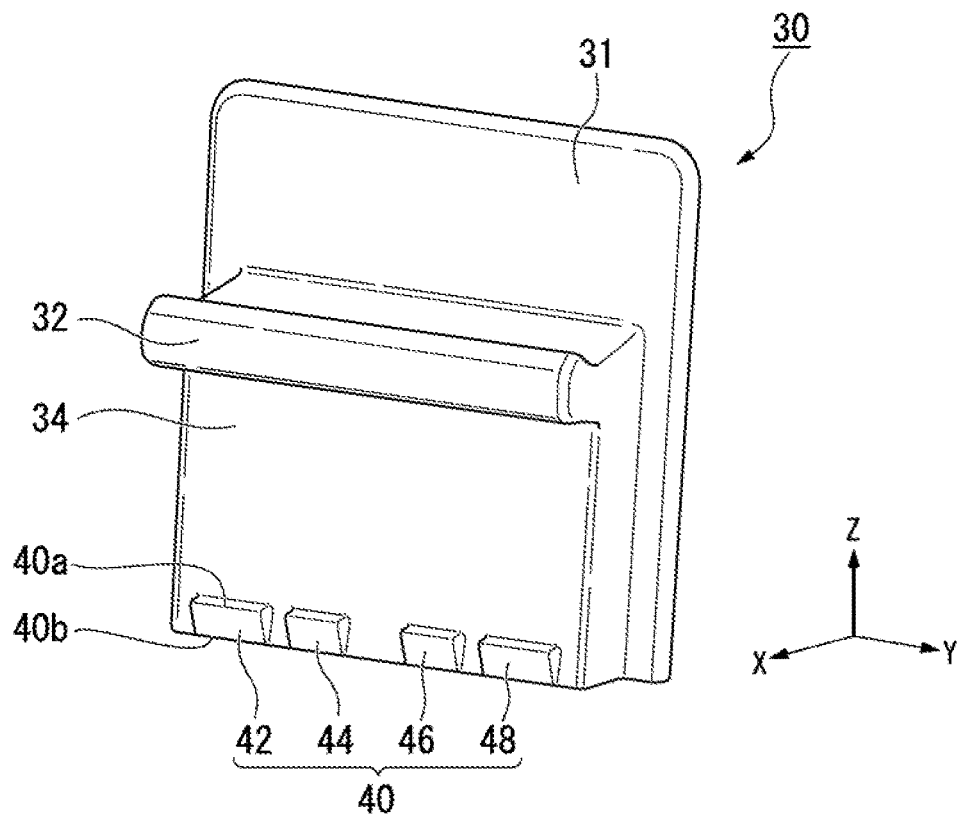
FIG. 3 is a perspective view of a knob main body from the front.

FIG. 3 is a perspective view of the knob main body 30 from the front. The knob main body 30 is integrally formed of for instance, a resin material. The knob main body 30 includes a base 31, the operation knob 32, and an overhang 34. The base 31 is formed in a rectangular shape when viewed in the +X direction. The operation knob 32 protrudes from the base 31 in the +X direction. The operation knob 32 has a predetermined width in the Y direction, and is formed in an approximately rectangular shape when viewed from the +Z direction. The passenger of the vehicle presses a surface of the operation lamb 32 which is directed in the +Z direction, thereby pulling down the operation knob 32 in the −Z direction. The overhang 34 overhangs from the base 31 in the +X direction. The overhang 34 is continuously formed from a surface of the operation knob 32 which is directed in the −Z direction to an end of the base 31 which is directed in the −Z direction.

Figure 5:
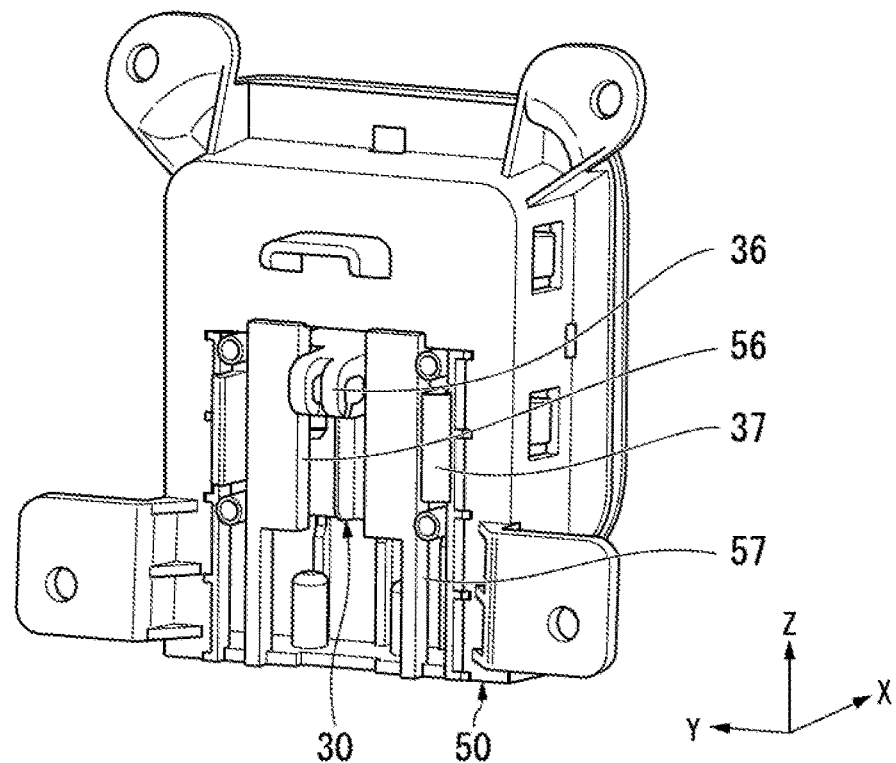
FIG. 5 is a perspective view of the operation knob device from the rear.

FIG. 5 is a perspective view of the operation knob device from the rear. The knob rain body 30 has a coupling part 36 and engaging parts 37 that protrude in the −X direction. The coupling part 36 is coupled to the locking mechanism (not shown).

The engaging parts 37 are engaged with the inner case 50, and regulate positions of the knob main body 30 which are located in the X and Y directions.

Figure 4:
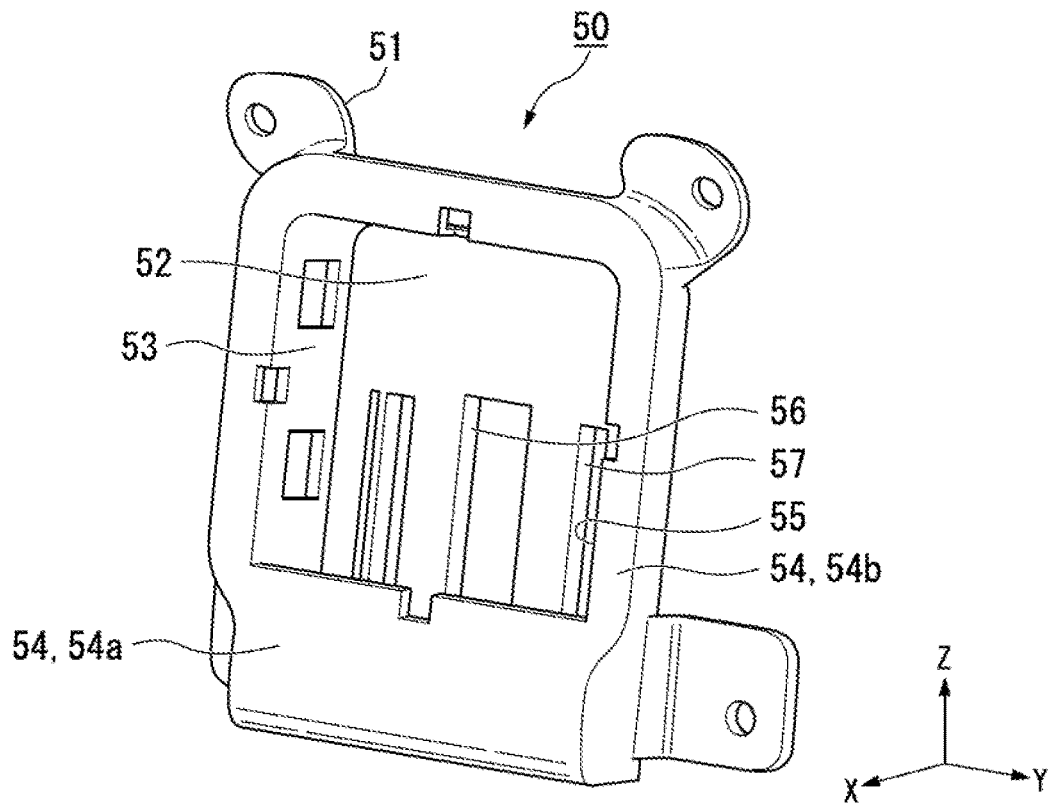
FIG. 4 is a perspective view of an inner case from the front.

FIG. 4 is a perspective view of the inner case from the front. The inner case 50 is integrally formed of, for instance, a resin material. The inner case 50 has a rear wall sidewall 53, and a front wall 54. The rear wall 52 is disposed parallel to a YZ plane. The rear wall 52 has a first slit 56 and second slits 57. As shown in FIG. 5, the coupling part 36 of the knob main body 30 is inserted into the first slit 56. The engaging parts 37 of the knob main body 30 are inserted into the second slits 57. The inner case 50 supports the knob main body 30 in a state in which the knob main body 30 is movable in the Z direction. As shown in FIG. 4, the sidewall 53 rises up from a periphery of the rear wall 52 in the +X direction. The mounts 51 on the armrest are formed on the sidewall 53.

The front wall 54 is disposed parallel to the YZ plane. The front wall 54 has a lower region 54a, a flange region 54b, and a first opening 55. The lower region 54a is disposed in the −Z direction (at a lower portion) of the front wall 54. The lower region 54a is disposed to face the rear wall 52 at a predetermined distance from the rear wall 52. The flange region 54b is disposed in the +Z direction (at an upper portion) of the front wall 54. The flange region 54b extends from an end of the sidewall 53 that is directed in the +X direction in a flange shape. The first opening 55 is disposed in the center of the front wall 54. The first opening 55 is surrounded by the lower region 54a and the flange region 54b. That is, the lower region 54a is disposed at a lower edge of the first opening 55.

Figure 6:
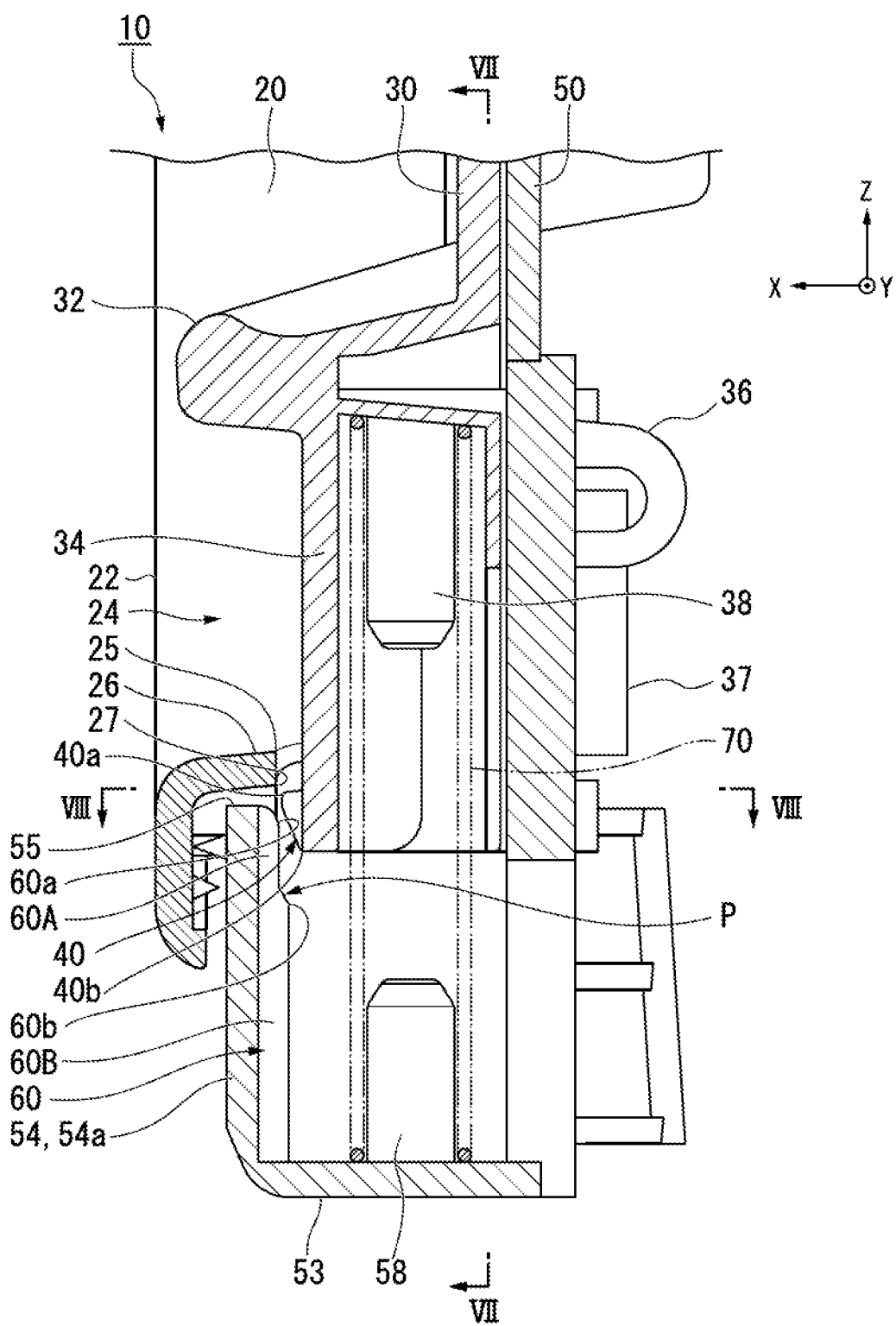
FIG. 6 is a sectional view taken along line VI-VI of FIG. 2.

FIG. 6 is a sectional view taken along line VI-VI of FIG. 2. The inner case 50 is disposed around the knob main body 30. The inner case 50 exposes the knob main body 30 from the first opening 55. A first spring support 38 is formed from the operation knob 32 of the knob main body 30 in the −Z direction. A second spring support 58 is formed from the bottom of the sidewall 53 of the inner case 50 in the +Z direction. A spring member 70 is disposed between the first spring support 38 and the second spring support 58. The knob main body 30 is biased against the inner case 50 in the +Z direction by the spring member 70. In a state in which the knob main body 30 is disposed at an upper end (a top dead center) in the +Z direction, the relationship between members will be described herein.

As shown in FIG. 2, the outer case 20 is integrally formed of, for instance, a resin material. The outer case 20 is formed in a rectangular shape in a front view from the +X direction. The outer case 20 has a forehead part 22, a second opening 24, and a tubular part 26 (see FIG. 6). The forehead part 22 is formed along an outer circumferential portion of the outer case 20. Tire second opening 24 is formed in the center of the outer case 20. The second opening 24 is formed in a rectangular shape in a front view from the +X direction. As shown in FIG. 6, the tubular part 26 rises up from a periphery of the second opening 24 in the −X direction. The outer case 20 covers a periphery of the first opening 55 of the inner case 50. The outer case 20 exposes the knob main body 30 from the second opening 24.

(Main Body Protrusions and Case Protrusions)

As shown in FIG. 3, the knob main body 30 has a plurality of main body protrusions 40. The main body protrusions 40 are formed at an end in the −Z direction of the overhang 34 of the knob main body 30. The main body protrusions 40 are formed on a surface of the overhang 34 that is directed in the +X direction. The main body protrusions 40 are formed in a rectangular shape in a front view from the +X direction. The main body protrusions 40 are longer in the Y direction than in the Z direction. The lengths of the plurality of main body protrusions 40 in the Y direction may be the same in whole, or be different in part.

As shown in FIG. 6, the main body protrusions 40 protrude toward the lower region 54a of the inner case 50 in the +X direction. Each of the main body protrusions 40 includes an upper end-cum-front end 40a that is an upper end thereof in the +Z direction and is a front end thereof in the +X direction. Each of the main body protrusions 40 includes a lower end-cum-front end 40b that is a lower end thereof in the −Z direction and is a front end thereof in the +X direction. The upper end-cum-front end 40a of each of the main body protrusions 40 has a higher protruding height from the overhang 34 (a height of the +X direction) than the lower end-cum-front end 40b. The protruding height of each of the main body protrusions 40 continuously reduces from the upper end-cum-front end 40a to the lower end-cum-front end 40b. A sectional shape of each of the main body protrusions 40 that is perpendicular to the Y direction is an approximately triangular shape.

Figure 7:
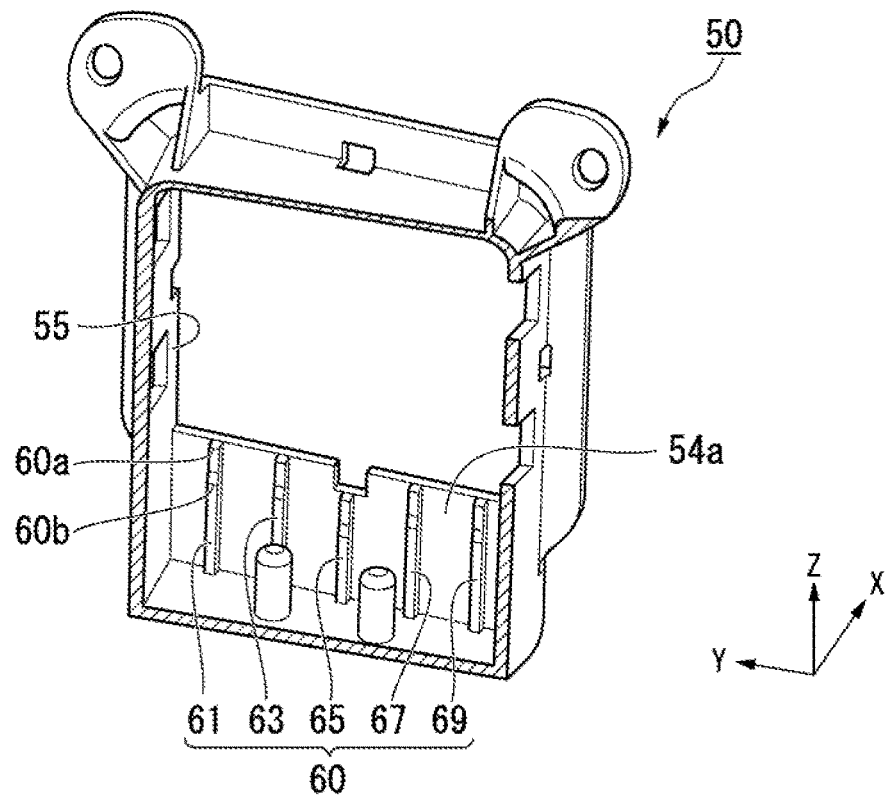
FIG. 7 is a sectional view of the inner case taken along line VII-VII of FIG. 6.

FIG. 7 is a sectional view of the inner case taken along line VII-VII of FIG. 6. The inner case 50 has a plurality of case protrusions 60. The ease protrusions 60 are formed on the lower region 54a at the lower edge of the first opening 55 of the inner case 50. The ease protrusions 60 are formed on a surface of the lower region 54a that is directed in the −X direction. The case protrusions 60 are formed as ridges extending in the Z direction. The case protrusions 60 are shorter in the Y direction than in the Z direction. The lengths of the plurality of case protrusions 60 in the V direction may be the same in whole, or be different in part.

As shown in FIG. 6, the case protrusions 60 protrude toward the knob main body 30 in the −X direction. Each of the case protrusions 60 has an upper half part 60A and a lower half part 60B. The upper half part 60A and the lower half part 60B are defined herein as follows. The upper half part 60A is a part that is disposed in the +Z direction from a predetermined position P on each of the ease protrusions 60 in the Z direction, and the lower half part 60B is a part that is disposed in the −Z direction from the predetermined position P on each of the case protrusions 60 in the Z direction. The predetermined position P is an arbitrary position on each of the case protrusions 60 in the Z direction, and is not limited to a middle position. The upper half part 60A includes an upper end-cum-front end 60a that is an upper end thereof in the +Z direction and is a front end thereof in the −X direction. The lower half part 60B includes an upper end-cum-front end 60b that is an upper end thereof in the +Z direction and is a front end thereof in the −X direction. The upper half part 60A of each of the case protrusions 60 has a lower protruding height from the lower region 54a (a height of the −X direction) than the lower half part 60B. The heights of the case protrusions 60 in the −X direction change at the predetermined position P between the upper half part 60A and the lower half part 60B. A sectional shape of each of the case protrusions 60 that is perpendicular to they, direction is a stepped shape.

As shown in FIG. 3, the plurality of main body protrusions 40 are arranged in the Y direction. In the present embodiment, four main body protrusions 40 including a first main body protrusion 42, a second main body protrusion 11, a third main body protrusion 46, and a fourth main body protrusion 48 are arranged in the Y direction in this order.

As shown in FIG. 7, the plurality of case protrusions 60 are arranged in the Y direction. In the present embodiment, five case protrusions 60 including a first case protrusion 61, a second case protrusion 63, a third case protrusion 65, a fourth case protrusion 67, and a fifth case protrusion 69 are arranged in the Y direction in this order.

The plurality of main body protrusions 40 and the plurality of case protrusions 60 are alternately disposed in the Y direction. That is, in the present embodiment, the main body protrusions 40 and the case protrusions 60 are disposed in the Y direction in the order of the first case protrusion 61, the first main body protrusion 42, the second case protrusion 63, the second main body protrusion 44, the third case protrusion 65, the third main body protrusion 46, the fourth case protrusion 67, the fourth main body protrusion 48, and the fifth case protrusion 69.

Figure 8:
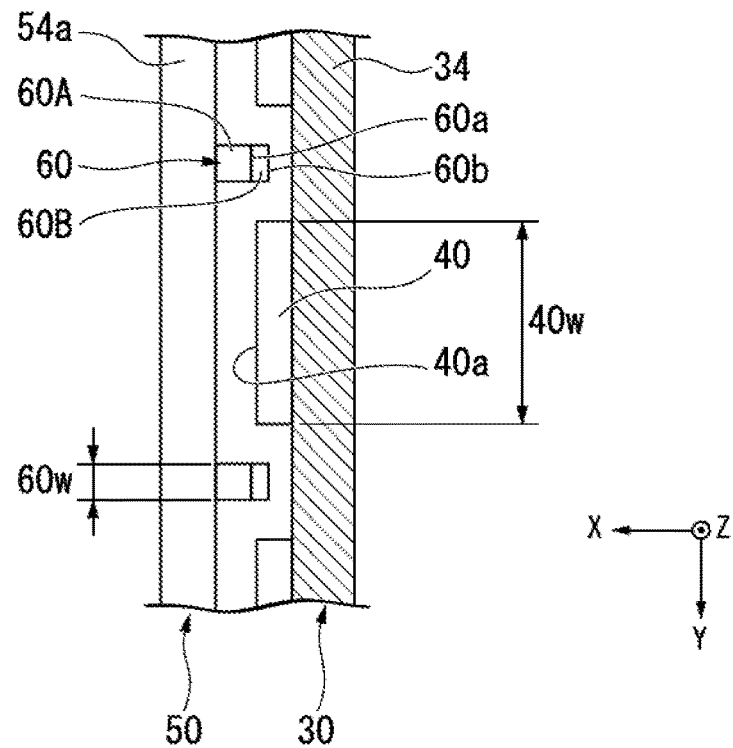
FIG. 8 is a partial sectional view taken along line VIII-VIII of FIG. 6.

FIG. 8 is a partial sectional view taken along line VIII-VIII of FIG. 6. The main body protrusions 40 and the case protrusions 60 that are adjacent in the Y direction are disposed at predetermined intervals in the Y direction. When viewed in the +Z direction (from above), a width 40w of each of the main body protrusions 40 in the Y direction is wider than a width 60w of each of the case protrusions 60 in the Y direction. The upper end-cum-front end 60a of the upper half part 60A of each of the case protrusions 60 is disposed at approximately the same position in the −X direction as the upper end-cum-front end 40a of each of the main body protrusions 40. The upper end-cum-front end 60b of the lower half part 60B of each of the case protrusions 60 is disposed in the −X direction from the upper end-cum-front end 40a of each of the main body protrusions 40 (closer to the knob main body 30).

As shown in FIG. 6, in the state in which the knob main body 30 is disposed at the upper dead center, the upper end-cum-front end 40a of each of the main body protrusions 40 is disposed in the −Z direction from a lower edge 25 of the second opening 24 of the outer case 20 in the −Z direction. The tubular part 26 of the outer case 20 includes a lower end-cum-front end 27 that is a lower end thereof in the −Z direction and is a front end thereof in the −X direction. The upper end-cum-front end 40a of each of the main body protrusions 40 is disposed slightly in the −Z direction from a lower end-cum-front end 27 of the tubular part 26 of the outer case 20. The lower end-cum-front end 27 of the tubular part 26 is disposed at approximately the same position in the X direction as the upper end-cum-front end 60a of the upper half part 60A of each of the case protrusions 60.

An operation of the operation knob device 10 configured as described above will be described. Here, a case in which a coin as a small object enters from the second opening 24 of the outer case 20 shown in FIG. 6 will be described by way of example.

The coin enters between the tubular part 26 of the outer case 20 and the overhang 34 of the lamb main body 30. In this case, the plurality of main body protrusions 40 catch the coin. As shown in FIG. 8, the width 40w of each of the main body protrusions 40 in the Y direction is wider than the width 60w of each of the case protrusions 60 in the Y direction. For this reason, a gap between neighboring main body protrusions 40 is small. Therefore, the coin does not fall into a gap between the case protrusion 60 of the inner case 50 and the overhang 34 of the knob main body 30.

As shown in FIG. 6, the upper end-cum-front end 40a of the main body protrusions 40 is disposed slightly in the −Z direction from a lower end-cum-front end 27 of the tubular part 26 of the outer case 20. For this reason, a gap between the outer case 20 and the main body protrusion 40 in the Z direction is small, and the coin does not fail into this gap.

When the operation knob device is operated and the knob main body 30 moves in the −Z direction, the coin caught by the plurality of main body protrusions 40 also moves in the −Z direction. In this case, the plurality of case protrusions 60 catch the coin. For this reason, the coin does not fall into a gap between the main body protrusion 40 of the knob main body 30 and the lower region 54a of the inner case 50. As shown in FIG. 8, the upper end-cum-front end 60b of the lower half part 60B of each of the case protrusions 60 is disposed in the −X direction from the upper end-cum-front end 40a of each of the main body protrusions 40. For this reason, no gap occurs between the case protrusion 60 and the main body protrusion 40 in the X direction. Thereby, the plurality of case protrusions 60 reliably catch the coin.

In this way, the plurality of main body protrusions 40 and the plurality of case protrusions 60 are alternately disposed, and thus the coin can be prevented from falling from the gap between the knob main body 30 and the inner case 50 into the inside of the operation knob device 10.

The operation knob device 10 for the armrest 8 of the present embodiment described in detail above includes the following constitution. The inner case 50 includes the plurality of ease protrusions 60 that protrude from the lower region 54a of the lower edge of the first opening 55 toward the knob main body 30. The knob main body 30 includes the plurality of main body protrusions 40 that protrude toward the lower region 54a of the inner case 50. The plurality of case protrusions 60 and the plurality of main body protrusions 40 are alternately disposed when viewed in the +Z direction (from above).

A small object such as a coin sometimes enters from the first opening 55 of the inner case 50 into the operation knob device 10. Even in this case, the plurality of main body protrusions 40 and the plurality of case protrusions 60 that are alternately disposed catch the small object. Thereby, the small object can be prevented from falling from the gap between the knob main body 30 and the inner case 50 into the inside of the operation knob device 10.

In the case protrusions 60, the protruding height of the upper half part 60A is lower than that of the lower half part 60B.

Since the protruding height of the upper half part 60A is low, the case protrusions 60 are hardly visible through the first opening 55 of the inner case 50. Therefore, the design of the operation lamb device 10 is improved.

The width of each of the main body protrusions 40 when viewed in the +Z direction (from above) is wider than that of each of the case protrusions 60 when viewed in the +Z direction (from above).

In this case, the gap between neighboring main body protrusions 40 is reduced. For this reason, a small object can be prevented from falling into the gap between the ease protrusion 60 of the inner case 50 and the knob main body 30.

In the main body protrusions 40, the protruding height of the upper end-cum-front end (the upper end) 40a is higher than that of the lower end-cum-front end (the lower end) 40b.

Since the protruding height of the upper end-cum-front end 40a is high, the main body protrusions 40 reliably catch a small object. Since the protruding height of the lower end-cum-front end 40b is low the knob main body 30 can be reduced in weight.

The upper end-cum-front end (the front end) 60b of the lower half part 60B of each of the case protrusions 60 is disposed closer to the knob main body 30 than the upper end-cum-front end (the front end) 40a of each of the main body protrusions 40.

According to this constitution, no gap occurs between the case protrusion 60 and the main body protrusion 40 in the X direction. Therefore, falling in of a small object can be reliably prevented.

The operation knob device includes the outer ease 20 that covers the periphery of the first opening 55 of the inner case 50 and exposes the operation blob 32 from the second opening 24, and the upper end-cum-front end (the upper end) 40a of each of the main body protrusions 40 is disposed below the lower edge 25 of the second opening 24.

Since the upper end-cum-front ends 40a of the main body protrusions 40 are disposed below, the main body protrusions 40 are hardly visible through the second opening 24 of the outer case 20. Therefore, the design of the operation knob device 10 is improved, The technical scope of the present invention is not limited to the aforementioned embodiment, and the present invention includes various modifications of the aforementioned embodiment without departing from the spirit or teaching of the present invention. That is, the constitution of the aforementioned embodiment is merely an example, and can be appropriately modified.

REFERENCE SIGNS LIST

8 Armrest
10 Operation knob device

20 Outer case (second case)
24 Second opening
25 Lower edge
30 Knob main body
32 Operation knob
40 Main body protrusion
40a Upper end-cum-front end (upper end, front end)
40b Lower end-cum-front end (lower end
40w Width
50 Inner case (first case)
54a Lower region
55 First opening
60 Case protrusion
60A Upper half part
60B Lower half part
60b Upper end-cum-front end (front end)
60w Width

What is claimed is:

1. An operation knob device for an armrest that is configured to unlock the armrest and move the armrest to a useable state, the operation knob device for an armrest comprising:
   a knob main body having an operation knob;
   a first case disposed around the knob main body and configured to expose the operation knob from a first opening; and
   a second case configured to cover a periphery of the first opening of the first case and expose the operation knob from a second opening,
   wherein the first case includes a plurality of case protrusions that protrude from a lower region of a lower edge of the first opening toward the knob main body,
   the knob main body includes a plurality of main body protrusions that protrude toward the lower region of the first case,
   the plurality of case protrusions and the plurality of main body protrusions are alternately disposed when viewed from above, and
   the upper end of each of the main body protrusions is disposed below a lower edge of the second opening.

2. The operation knob device for an armrest according to claim 1, wherein each of the case protrusions is configured such that a protruding height of an upper half part thereof is lower than that of a lower half part thereof.

3. The operation knob device for an armrest according to claim 1, wherein a width of each of the main body protrusions when viewed from above is wider than that of each of the case protrusions when viewed from above.

4. The operation knob device for an armrest according to claim 1, wherein each of the main body protrusions is configured such that a protruding height of an upper end thereof is higher than that of a lower end thereof.

5. The operation knob device for an armrest according to claim 1, wherein a front end of each of the case protrusions is disposed closer to the knob main body than a front end of each of the main body protrusions.

6. An operation knob device for an armrest that is configured to unlock the armrest and move the armrest to a useable state, the operation knob device for an armrest comprising:
   a knob main body having an operation knob;
   a first case disposed around the knob main body and configured to expose the operation knob from a first opening; and
   engaging parts formed on the back of the knob main body and engaged with the first case,
   wherein the first case includes a plurality of case protrusions that protrude from a lower region of a lower edge of the first opening toward the knob main body,
   the knob main body includes a plurality of main body protrusions that protrude toward the lower region of the first case,
   the plurality of case protrusions and the plurality of main body protrusions are alternately disposed when viewed from above,
   each of the case protrusions is configured such that a protruding height of an upper half part thereof is lower than that of a lower half part thereof, and
   the engaging parts regulate positions of the knob main body with respect to the first case in a forward/backward direction and a leftward/rightward direction in a vehicle.

7. The operation knob device for an armrest according to claim 6, wherein a width of each of the main body protrusions when viewed from above is wider than that of each of the case protrusions when viewed from above.

8. The operation knob device for an armrest according to claim 6, wherein each of the main body protrusions is configured such that a protruding height of an upper end thereof is higher than that of a lower end thereof.

9. The operation knob device for an armrest according to claim 6, wherein a front end of each of the case protrusions is disposed closer to the knob main body than a front end of each of the main body protrusions.

10. The operation knob device for an armrest according to claim 6, further comprising a second case configured to cover a periphery of the first opening of the first case and expose the operation knob from a second opening,
   wherein the upper end of each of the main body protrusions is disposed below a lower edge of the second opening.

* * * * *